United States Patent
Hutchinson et al.

(10) Patent No.: US 7,753,762 B2
(45) Date of Patent: Jul. 13, 2010

(54) OPTICAL DISC DESTRUCTION DEVICE

(75) Inventors: Roger S. Hutchinson, Hopkins, MN (US); Hsi-Ling (Frank) Lee, Taipei (TW)

(73) Assignee: D3, Inc.

( * ) Notice: Subject to any disclaimer, the term of this patent is extended or adjusted under 35 U.S.C. 154(b) by 0 days.

(21) Appl. No.: 11/427,358

(22) Filed: Jun. 29, 2006

(65) Prior Publication Data

US 2007/0069570 A1    Mar. 29, 2007

Related U.S. Application Data

(60) Provisional application No. 60/696,497, filed on Jun. 30, 2005.

(51) Int. Cl.
  *B24B 3/00*    (2006.01)
  *B24B 5/00*    (2006.01)
  *B24B 1/00*    (2006.01)
  *B02C 25/00*   (2006.01)

(52) U.S. Cl. .......................... 451/246; 451/63; 241/30; 241/277

(58) Field of Classification Search .............. None
See application file for complete search history.

(56) References Cited

U.S. PATENT DOCUMENTS

| | | | | |
|---|---|---|---|---|
| 5,220,754 A | * | 6/1993 | Tayebi et al. | 451/59 |
| 5,619,898 A | * | 4/1997 | Witt | 83/870 |
| 5,954,569 A | | 9/1999 | Hutchison et al. | |
| 6,039,637 A | * | 3/2000 | Hutchison et al. | 451/271 |
| 6,322,430 B1 | | 11/2001 | Kennedy et al. | |
| 6,334,582 B1 | | 1/2002 | Castronovo | |
| 6,379,224 B1 | * | 4/2002 | Ito | 451/41 |
| 6,595,835 B2 | * | 7/2003 | Gadbois | 451/66 |
| 2001/0027084 A1 | | 10/2001 | Takahashi et al. | |
| 2002/0038830 A1 | * | 4/2002 | Castronovo | 241/30 |
| 2002/0187733 A1 | * | 12/2002 | Lalli et al. | 451/41 |
| 2003/0174616 A1 | | 9/2003 | Constantinou et al. | |
| 2004/0014404 A1 | | 1/2004 | Miller | |
| 2004/0125722 A1 | | 7/2004 | Feehan et al. | |
| 2006/0072432 A1 | | 4/2006 | Ito | |

FOREIGN PATENT DOCUMENTS

WO    WO 97/28924    8/1997

* cited by examiner

*Primary Examiner*—Bryan R Muller
(74) *Attorney, Agent, or Firm*—Skinner and Associates (57) ABSTRACT

A device for removing an information-bearing layer of an optical disc comprises a housing defining a first chamber and a second chamber, a mount to selectively mount an optical disc having an information-bearing layer adjacent the first chamber, a cutter within the first chamber, a drive mechanism operatively connected to the cutter, and a passageway between the first and second chambers. The cutter causes the information-bearing layer of the disc to form particulate matter, and the particulate matter is caused to move through the passageway into the second chamber. The resulting particulate matter has a particle size less than about 326 microns to meet the standards of the Department of Defense and NIST for digital data destruction.

24 Claims, 6 Drawing Sheets

OPTICAL DISC DESTRUCTION DEVICE

CROSS-REFERENCE TO RELATED APPLICATION

This application is based upon commonly assigned U.S. Provisional Patent Application Ser. No. 60/696,497, filed Jun. 30, 2005, which is incorporated herein in its entirety.

FIELD OF THE INVENTION

This invention relates to the destruction of information on optical discs such as a CD, DVD, or the newest Blu-Ray DVD. More particularly, this invention relates to devices for destroying industrial and government proprietary and confidential information to meet the standards of the National Institute of Standards and Technology (NIST) and the Department of Defense. The devices are quick and convenient to operate while being highly dependable and efficient.

BACKGROUND OF THE INVENTION

Corporate and government security procedures have long utilized destruction techniques and devices to prevent the unnecessary storage and unauthorized distribution of sensitive or confidential information. Such destruction frequently takes place routinely according to pre-determined time schedules as well as in emergency situations. Previously, incinerators as well as paper shredders of various sizes and speeds have been utilized to destroy government or corporate proprietary and confidential information both routinely as well as during emergency situations, such as during the takeover of the U.S. Embassy in Tehran or on board U.S. warships. Unfortunately, the mere volume of such confidential paper documents prohibits an effective emergency destruction process. Moreover, even paper shredders having very fine shredding capability are not entirely effective in preventing the reconstruction of the documents and retrieval of at least some of the information contained therein. This, too, became apparent during the Tehran incident.

With an ever-growing demand for 8 cm and 12 cm compact disc related products as well as the continuing increase in data storage capacity, of such discs, businesses and government agencies are placing more and more sensitive and corporate-confidential information on optical discs such as compact discs (CD's), DVD's, and Blu-Laser. While such compact and efficient data storage media has significantly reduced the volume problem associated with prior confidential paper documents as discussed above, such optical disc storage has created problems of its own, such as how to destroy an optical disc or at least the information contained thereon once it has been created.

Typical commercial or home destruction of an optical disc involves shredding or slicing the disc into small pieces. Such destruction is of limited effectiveness since even a 1 mm×1 mm particle of a shredded disc could contain as much as one hundred or more pages of information and there is available software that can read such information from the digital signatures.

In response to the ever-increasing use of optical discs as a media storage form, and in recognition of the limitations of shredding or other physical destruction processes, the Department of Defense (DOD) issued secure destruction standards for compact disc media. Specifically, the DOD requires that when the information-bearing surface (IBS) of a CD is altered to the extent that no exploitable information can be recovered, then the CD is considered securely destroyed. NIST also is working on standards for media sanitization for all known electronic media under their "Guidelines for Media Sanitization". The principal goal of any destruction process for optical discs is to assure that no exploitable information can be recovered from an information-bearing layer of the optical disc. If a destruction process consumes the entire optical disc, the resulting particles can be no larger than 0.25 mm or 250 microns in any dimension in order to insure 100% destruction of digital data. Alternatively, if the destruction process destroys only an information bearing surface layer of the optical disc, then the dimensions of the resulting particulate residue cannot be greater than 0.25 mm or 250 microns, while the remaining polycarbonate substrate layer cannot be greater than 1.05 mm+/−0.03 mm thick.

There are several devices presently available that destroy the information-bearing layer of an optical disc to the standards of the DOD. Emerging products, including the one herein described, addresses standards not only suitable to the DOD but to commercial interests as well. Such a device addresses in a fundamental way the loopholes that exist in Federal legislation that call for safe digital data destruction in HIPAA, Gramm-Leach Bliley, FACTA, Sarbannes-Oxley and other legislation that calls for total destruction of digital data, but fall short of identifying the technical processes. However, there is a need for an easy to operate, portable device that can adjust its cutting parameters to the type of optical disc being treated.

OBJECTS OF THE INVENTION

It is an object of the present invention to provide a device for removing proprietary and confidential information from an optical disc.

It is also an object of the present invention to provide such a device which can be operated quickly yet assures complete destruction of the information or data contained on an optical disc.

It is a further object of the present invention to provide a device which is easy to operate and portable.

It is a further object of the present invention to provide a device comprising a housing where an optical disc is treated to remove the information-bearing layer as particulate matter.

It is a further object of the invention to provide a device where a cutting mechanism is mechanically or electrically connected to a vacuum system that removes particulate matter.

It is a further object of the invention to provide a device which can be adjusted to accommodate differing types and/or thicknesses of optical disc.

It is a further object of the invention to provide a device for removing an information-bearing layer of an optical disc, which comprises:

a housing defining a first chamber and a second chamber;

means to selectively mount an optical disc having an information-bearing layer adjacent the first chamber;

a cutter within the first chamber;

a drive or drive means operatively connected to the cutter; and a passageway between the first and second chambers, wherein the cutter causes the information-bearing layer of the disc to form particulate matter and the particulate matter is caused to move through the passageway into the second chamber.

These and other objects of the invention will become more apparent in the discussion below.

SUMMARY OF THE INVENTION

In accordance with the invention, an embodiment of the invention comprises a housing having a first chamber and a second chamber. The first chamber comprises a receiving area for an optical disc, a disc drive means, and a cutter. The disc is positioned on a spindle, and the spindle moves the disc to a position where the outer edge of the disc engages the disc drive means to rotate the disc and where the cutter engages the downward facing surface of the disc. The cutter is biased against the disc so that the cutter removes an information-bearing layer from the disc as particulate matter or material.

The disc drive and the cutter have separate drive motors that operate in tandem. These motors are mechanically or electrically linked together so that they both operate at the same time, but their respective speeds can be varied independent of one another. The cutter is preferably mounted on the vacuum or driven by the same motor that powers the vacuum, and the vacuum motor is engineered in such a manner that the one motor, which is highly efficient, acts as both the motor to turn the propellers for the vacuum and as the drive for the cutter. The rotational velocity of the cutter is not necessarily the same as the rotational velocity of the disc drive or the disc. In fact, the rotational velocity of the cutter is preferably from about 2 to about 8 times the rotational velocity of the disc. The cutter, which preferably is driven by a DC motor, rotates at approximately 6500 rpm while the disc drive rotates at approximately 2400 rpm. The use of a DC motor is responsible for the high rate of rotational velocity of the cutter, which could not be achieved with an AC motor. It is believed that the maximum rotational velocity of a cutter driven by an AC motor would only be about 1800 rpm.

The particulate matter is drawn downward from the disc into a chamber that is fluidly connected through an opening to the second chamber. Preferably there is a disposable bag or other collection device in the second chamber to collect the particulate matter for secure disposal.

The cutter preferably is a rigid tubular member having a cutting or abrasive surface or facets. The cutting surface or facets may have diamonds or other hard materials embedded therein, or the cutting surface may be a serrated metal surface or the facets may comprise serrated metal. Preferred materials are metals such as tungsten or steel, optionally with carbide tips and heat treated or tempered metals.

The cutter unit may comprise two or more interchangeable members. In one embodiment of the invention a cutter member is capable of cutting through the hard outer coatings of an optical disc on recordable media and/or commercially produced media. In another embodiment of the invention a cutter member is capable of cutting through and/or removing applied labels, i.e., "sticky" labels, on optical discs. This is particularly relevant to the removal of the sticky labels used by the military to indicate levels of security for optical media, such as "Secret", "Top Secret", and above. In another embodiment of the invention, the cutter's facet's are interchangeable, and they can be tooled to conform to the penetration depths and angles needed to break through the protective layers of an optical disc and then to remove the information-bearing layer or layers beneath.

In another embodiment of the invention the device has an adjustable pressure component. This pressure component is designed to conform to the differences in thickness of the optical discs, whose information-bearing layers can have a depth of from about 0.044 in. to about 0.051 in. with respect to CD-ROMs and from about 0.1 mm to about 0.6 mm with respect to DVDs.

In a preferred embodiment of the invention the cutter is at an angle (other than perpendicular) to the surface of the optical disc. It has been found that when the longitudinal axis of the cutter member is at an angle of from about 70 to 80 degrees, more preferably about 75 degrees, to the surface of the disc, cutting of the information layer seems to be more effective and efficient. One optimum angle of the cutter to the surface as measured horizontally is 22.5°.

In one embodiment of the invention, a device for removing an information-bearing layer of an optical disc comprises:

a housing defining a first chamber and a second chamber;

a mount or means to selectively mount an optical disc having an information-bearing layer adjacent the first chamber, a cutter within the first chamber, a drive or drive mechanism operatively connected to the cutter, and a passageway between the first and second chambers, wherein the cutter causes the information-bearing layer of the disc to form particulate matter and the particulate matter is caused to move through the passageway into the second chamber.

In another embodiment of the invention, the cutter is biased against the optical disc.

In another embodiment of the invention, the second chamber contains or comprises a removable member that receives particulate matter.

In another embodiment of the invention, the cutter comprises a cylindrical cutting tool with an abrasive or serrated cutting edge.

In another embodiment of the invention, the particulate matter has a particle size of about 326 microns or less.

In another embodiment of the invention, the particulate matter has a particle size of larger than about 326 microns to about 5 mm.

In another embodiment of the invention, the particulate matter has a particle size of less than about 250 microns.

In another embodiment of the invention, the particulate matter has a particle size of from about 2 to about 200 microns, preferably from about 10 to about 150 microns.

In another embodiment of the invention, the cutter drive means causes particulate matter to flow into the second chamber.

In another embodiment of the invention, the cutter drive means comprises vanes that move air to cause the particulate matter to flow.

In another embodiment of the invention, the second chamber comprises a paper or plastic bag that is disposable.

In another embodiment of the invention, a removable lid covers the second chamber.

In another embodiment of the invention, a lid or cover covers the first chamber.

In another embodiment of the invention, an additional cover member covers a disc cutter area.

In another embodiment of the invention, the lid or cover has a surface with a disc retaining spindle to hold the optical disc.

In another embodiment of the invention, the spindle moves along a groove or tract to cause the optical disc to engage a disc drive that causes the optical disc to rotate.

In another embodiment of the invention, the cutter engages an information-bearing layer of the optical disc.

In another embodiment of the invention, a device for removing an information-bearing layer of an optical disc while maintaining the integrity and identification of the substrate layer, comprises:

a housing defining a first chamber and a second chamber adjacent said first chamber;

means for selectively mounting a compact disc adjacent said first chamber;

means disposed within said first chamber for physically removing the information-bearing layer of an optical disc positioned on said mounting means by reducing it to particulate material; and means for biasing said physical removal means against the information-bearing layer of an optical disc positioned on said mounting means as said information-bearing layer is reduced to particulate material.

In another embodiment of the invention, in a device for the destruction of an information-bearing layer of an optical disc to prevent the recovery of exploitable information therefrom including a housing for containing means for destroying the information-bearing layer, an improvement comprises a housing member having means for selectively mounting an optical disc therewithin, means disposed within said housing for removing the information-bearing layer from the substrate layer of an optical disc positioned within said housing by physically reducing said information-bearing surface to particulate matter, and means for biasing said removal means against the information-bearing surface of an optical disc positioned on said mounting means as said information-bearing layer is reduced to particulate matter.

In another embodiment of the invention, the device destroys the information-bearing layer of an optical disc while retaining the non-information-bearing substrate layers thereof substantially intact.

In another embodiment of the invention, the housing includes a first chamber and a second chamber adjacent said first chamber, wherein said removal means are disposed within said first chamber, and wherein said second chamber includes means for reducing the size of said particulate matter to 326 microns or less, preferably less than 250 microns.

In another embodiment of the invention, the cutter and the vacuum system are driven by the same motor.

In another embodiment of the invention, a device for removing an information-bearing layer of an optical disc comprises a first chamber having a mount to selectively mount an optical disc having an information-bearing layer and a cutter, a second chamber having a vacuum device within or in fluid communication with said second chamber, and a passageway between the first and second chambers, wherein a dual purpose drive or drive mechanism is operatively connected to the cutter and to the vacuum device.

In another embodiment of the invention, the cutter causes the information-bearing layer of the disc to form particulate matter and the particulate matter is caused to move through the passageway into the second chamber.

In another embodiment of the invention, the optical disc is rotated by a separate drive means.

BRIEF DESCRIPTION OF THE DRAWINGS

The accompanying drawings which are incorporated in and form a part of the specification illustrate preferred embodiments of the present invention and, together with a description, serve to explain the principles of the invention. In the drawings.

DETAILED DESCRIPTION OF THE INVENTION

Since the beginning of the CD-ROM and DVD industry, there has been a need to destroy the information and data carried by an optical disc such as a compact disc, as discussed above. To date, there has been a distinct lack of lightweight or low cost portable units available to the military or to such diverse businesses as banks and large corporations that publish confidential and sensitive information on optical discs and which would enable such entities to accomplish the important objective of destroying the compact discs once their usefulness has expired. As previously indicated, the Department of Defense (DOD) has issued destruction standards for compact disc media, as has NIST. Whether the entire disc is destroyed or just the information bearing surface thereof, the resultant information-containing particulate material must be at least 250 microns or less in size in order for 100% safe digital destruction. Otherwise, optical microscopy can be utilized to extract data and information from particles larger than this size. Moreover, it is also highly desirable to be able to save the polycarbonate substrate layer of the compact disc for subsequent recycling as well as positive identification for documenting the disc destruction. The device of the present invention accomplishes both of these very important functions.

It should be understood that the term "optical disc" as used herein and in the claims attached hereto is understood to include field upgradable forms of optical media including, but not limited to, commercially produced CD-ROM, commercially produced DVD-ROM, CD-R, DVD-R, DVD, DVD9, DVD-RAM, DVD-ROM, DVD-Erasable, DVD-Rewritable, Blue Laser and Blu-Ray in all their forms, and other forms of optical media.

Figure 1:
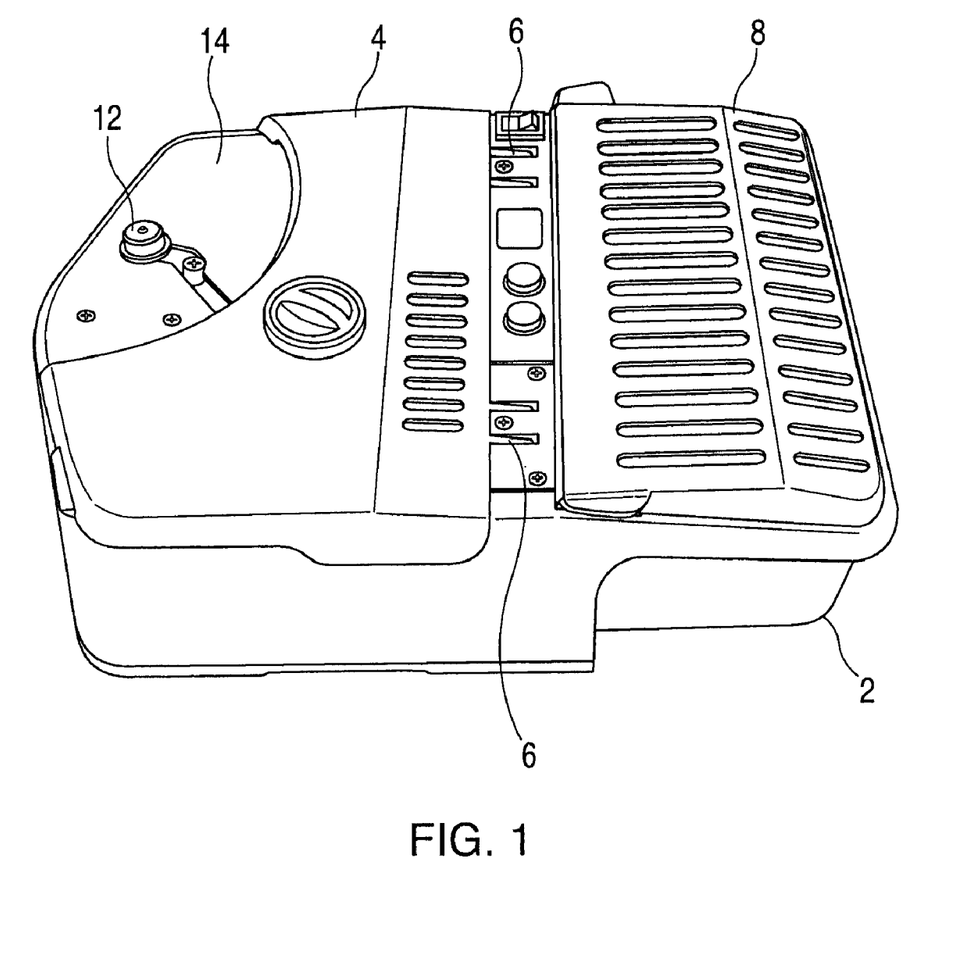
FIG. 1 is an oblique, substantially lateral view of an embodiment of the invention.

Perhaps the invention can be better understood from the drawings. FIG. 1 is an oblique, substantially lateral view of an embodiment of the invention, where a housing 2 has a first hinged lid or cover 4 with hinges 6 and a second hinged lid or cover 8 with rear hinges (not shown). A CD or other optical disc can be positioned on a disc retaining spindle 12 on surface 14.

Figure 2:
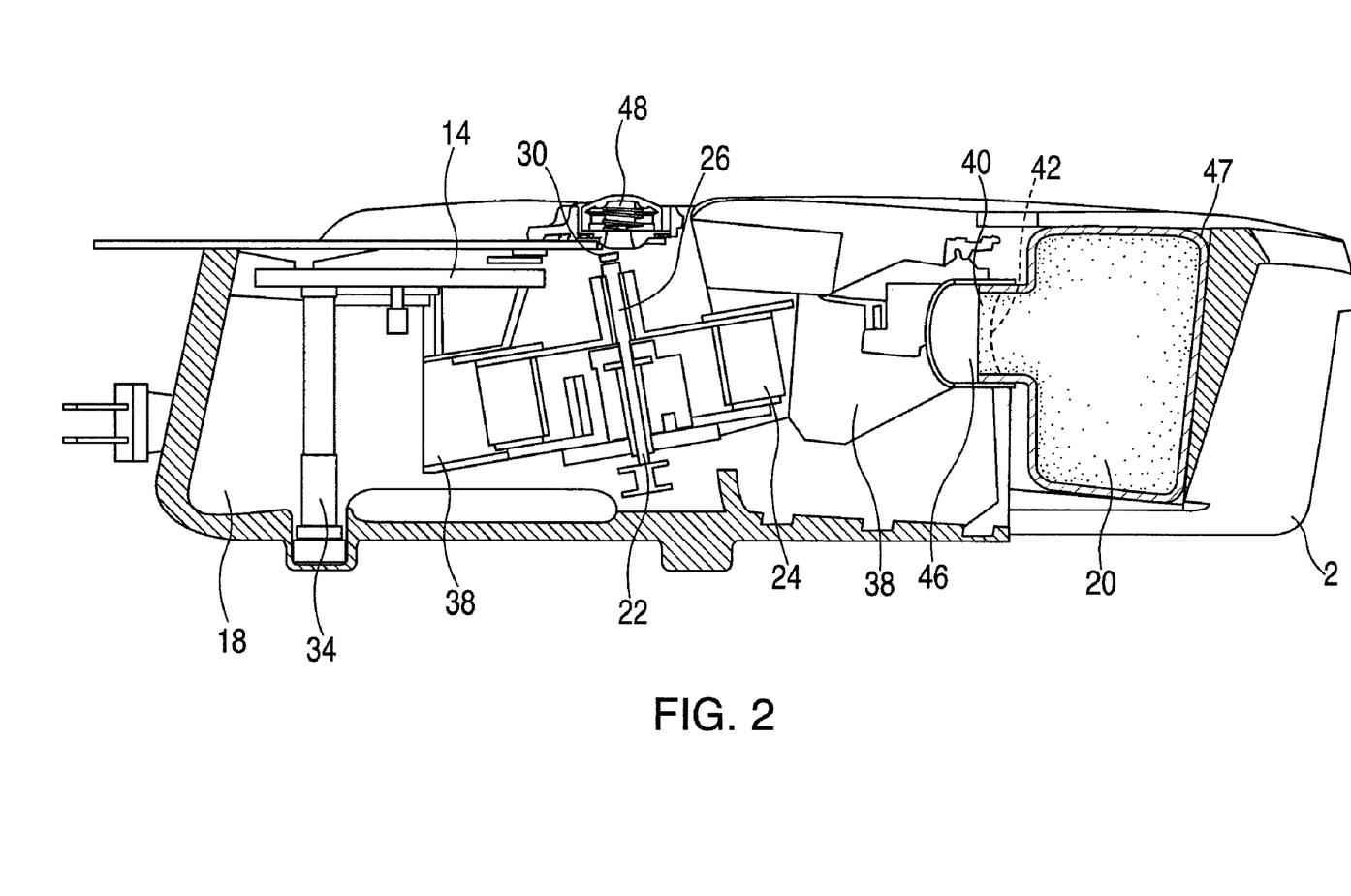
FIG. 2 is a substantially cross-sectional view of the embodiment of the invention shown in FIG. 1.

In the substantially cross-sectional schematic of FIG. 2, housing 2 defines a first chamber 18 and a second chamber 20. Within chamber 18 is a drive member 22 that comprises two or more vanes 24 and cutter or cutting member 26. At the upper portion of cutter 26 is cutting edge or surface 30.

A support member 34 supports surface 14. Within first chamber 18 a particulate transfer chamber 38 extends to an opening 40 in a wall 42 between first chamber 18 and second chamber 20. Opening 40 preferably engages a cylindrical member 46 that will direct particulate matter into a disposable paper or plastic bag (not shown).

A disc drive mechanism 48 to cause an optical disc to rotate is mechanically connected to drive member 22. The rotational velocity of drive member 22 can be the same as or less than the rotational velocity of disc drive mechanism 48. Preferably the rotational velocity of drive member 22 and cutter 26 is from about two to five times the rotational velocity of disc drive mechanism 48.

Figure 3:
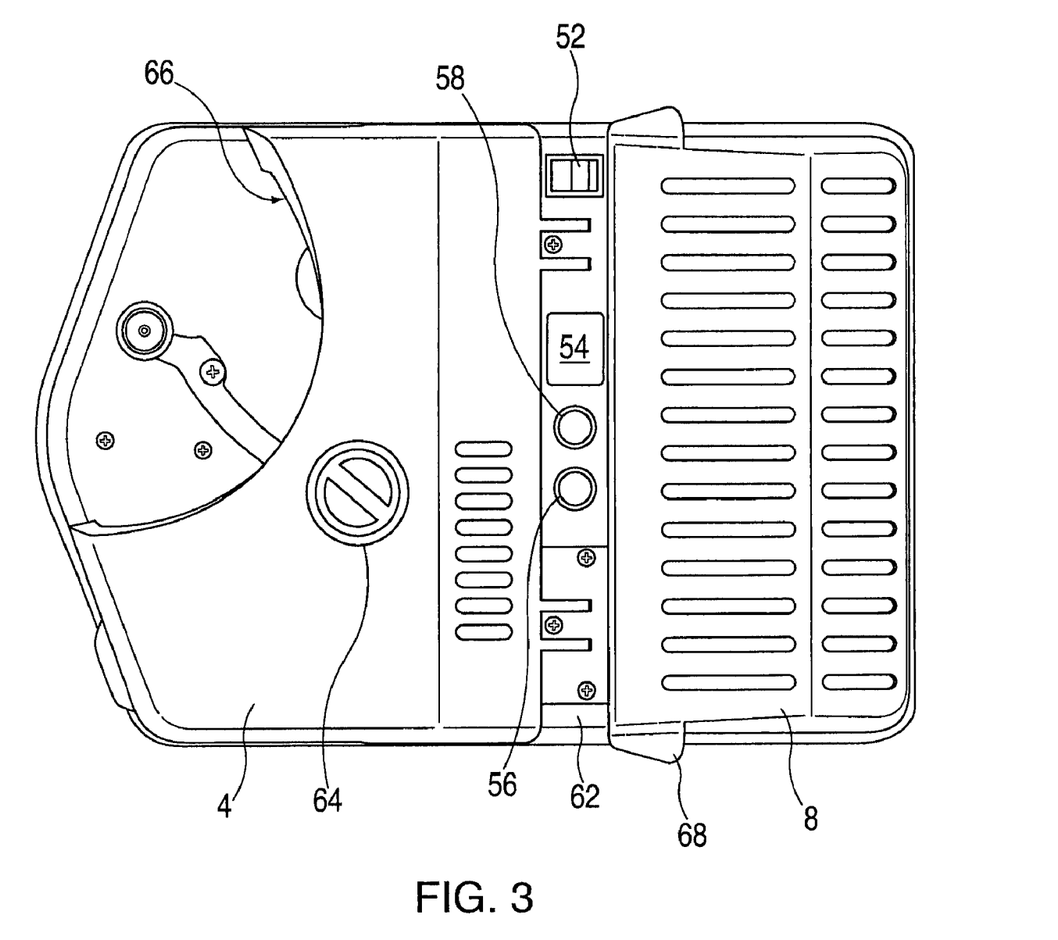
FIG. 3 is a top view of the embodiment of the invention illustrated in FIG. 1.

A top view of an embodiment of the invention is shown in FIG. 3. A power on/off switch 52, an LED indicator 54, and on and off buttons 56 and 58, respectively, are positioned on a top surface 62 between cover 4 and cover 8. On cover 4 an adjustment switch or dial 64 is adjacent a recess 66 that is shaped to allow clearance around an optical disc that may be positioned on spindle 14. A finger grip 68 is positioned on each side of cover 8.

Figure 4:
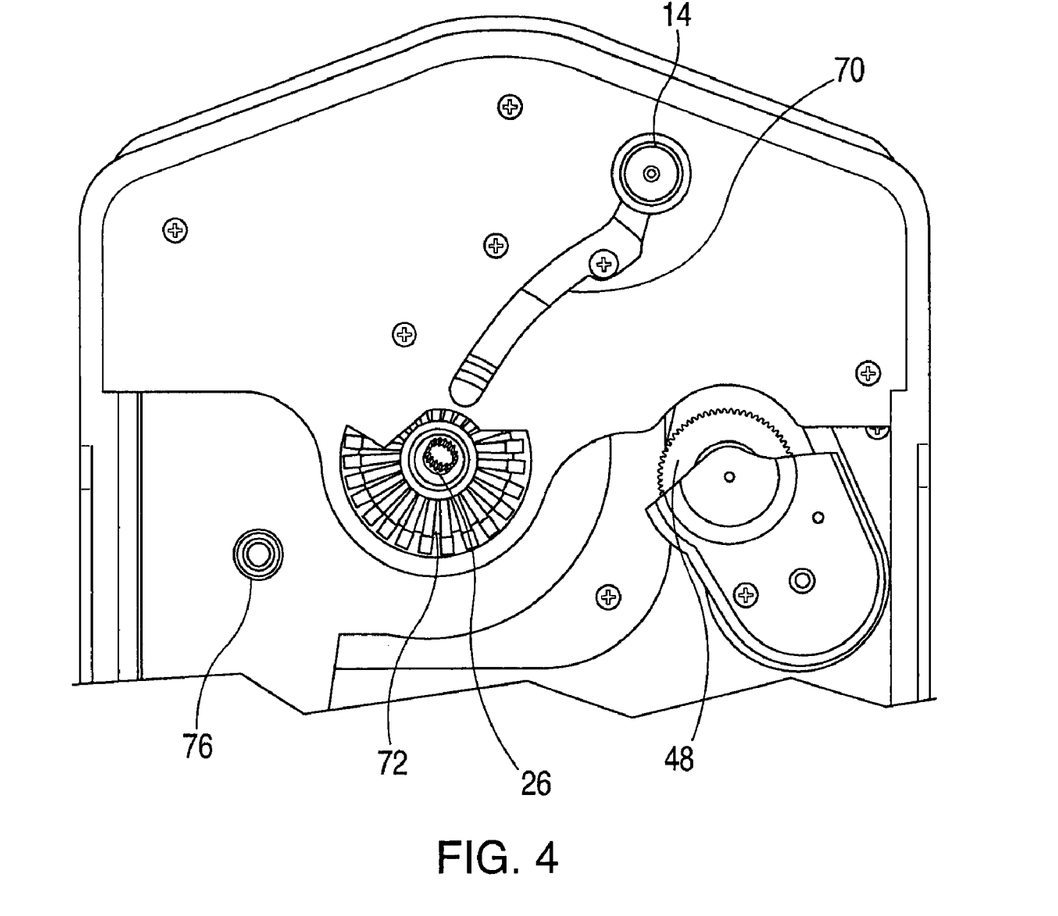
FIG. 4 is a partial top view of the embodiment of the invention illustrated in FIG. 1, with a cover piece removed.

FIG. 4 represents a partial top view of an embodiment of the invention where cover 4 has been removed or rotated out of the view. Spindle 12, which is shown in a "start" position, is mechanically connected to a mechanism (not shown) in chamber 18. When an optical disc is placed on spindle 14 and start button 56 is pushed, spindle 12 and the disc move along groove or track 70 toward cutter 26 and disc drive mechanism 48. Disc drive mechanism 48 then causes the disc to rotate while cutter 26 removes the information-bearing layer. Particulate matter from the information-bearing layer is "sucked" through at least the openings 72 around cutter 26 into particulate transfer chamber 38 to be collected in second chamber 20.

A unique feature of the invention is the ability to adapt to optical discs of different types and/or sizes. There are at least two places on this embodiment of the invention where adjustments can be made. First, an Allen wrench receptable 76 on surface 14 can be rotated to make "coarse" adjustments. Also, knob 64 on cover 4 is intended to facilitate finer adjustments. The cutter may not produce a clean disc if contact between the disc and the cutter is too loose or too tight.

Adjustment begins with the fine control knob 64 turned to the minimum setting (counter-clockwise). The ideal setting for the coarse control is set when the cutter just skims the disc surface. The coarse control 76 is modified by using a number 5 metric Allen wrench, where the Allen wrench is rotated in ¼ turn intervals until the ideal setting is reached. A disc should be tested at each interval until the ideal setting is reached. Adjusting the coarse control counter-clockwise decreases the force between the disc and cutter; clockwise adjustment increases the force between the disc and cutter. Adjustments are also possible using an automated sensor and pressure switch which removes manual intervention from the adjustment process.

Once the ideal setting on the coarse control has been reached, the cutter adjustment should be fine-tuned by gently depressing and turning the fine adjustment one click clockwise. Then, a disc should be tested, and the procedure should be repeated as necessary. A maximum of ten settings is provided; if the course adjustment is appropriately set, the fine adjustment should only require three or four turns.

Figure 5:
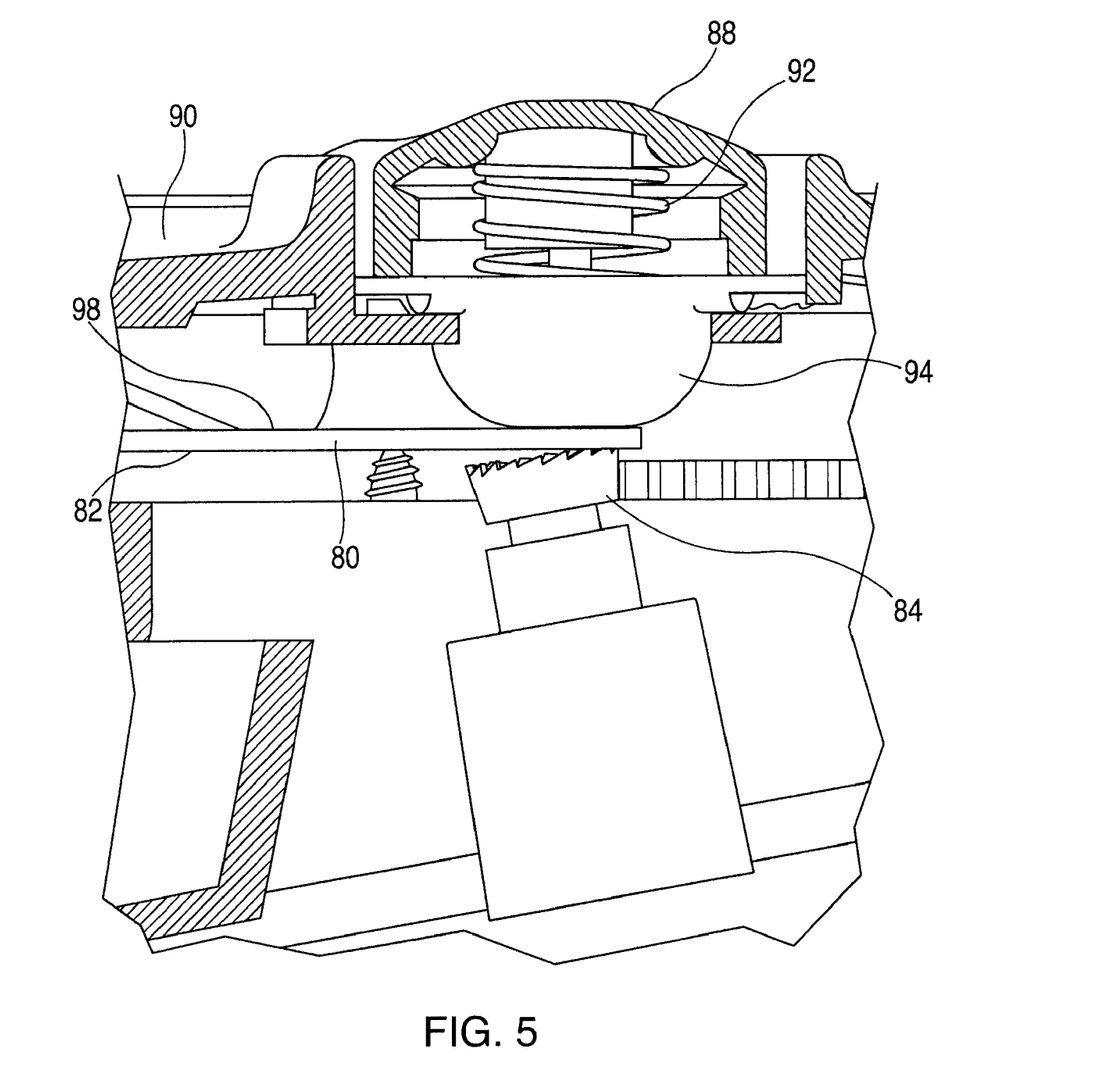
FIG. 5 is a partially cross-sectional view of a detail of the embodiment of the invention illustrated in FIG. 1.

One of the adjustment mechanisms is shown in detail in FIG. 5, which is a partially cross-sectional schematic of a detail of an embodiment of the invention. An optical disc 80 has been positioned where its lower surface 82 is in contact with cutter head 84. Dial/switch 88 in cover 90 is connected through a spring bias 92 with contact 94. Turning dial/switch 88 causes contact 94 to raise or lower, thus determining the pressure contact 94 exerts on the upper surface 98 of optical disc 80.

Figure 6:
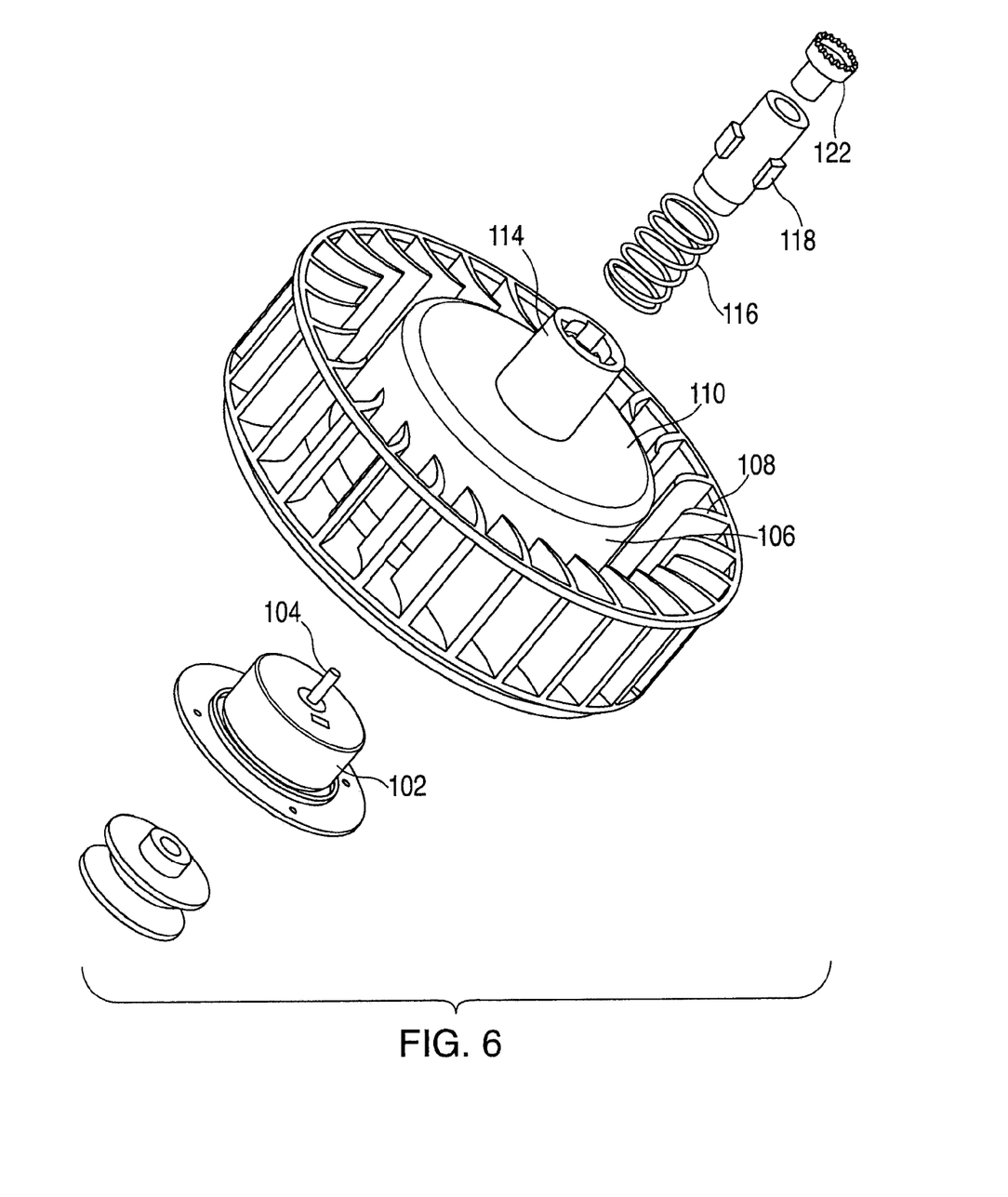
FIG. 6 is an exploded view illustrating the various components of the first embodiment of the present invention.

Cutter head 122 is preferably replaceable. The device can be designed so that either cutter head 122 alone is replaceable or both cutter head 122 and cutter support member 118 are replaceable together. Preferably there will be a typical push-in-and-twist type of function to facilitate the replacement.

Another detail of the invention is shown in FIG. 6, which is a schematic of the cutter and cutter device mechanism. An electric motor 102 has a drive shaft 104 that engages and rotates vane assembly 106. Vane assembly 106 has vanes 108 that create fluid motion to move particulate matter. The distal surface 110 of vane assembly 106 has a cylindrical fitting 114 that receives and engages a spring 116 and a cutter support member 118. Cover support member 118 in turn receives and removably engages cutter head 122 with a cutting surface.

Preferably a device according to the invention will have more than one speed. In one embodiment, "Speed 1" is the fastest speed. It cuts the information layer in about 15 seconds in the unit developed for the DOD. In a commercial unit, the cutting time is twice as long to account for thicker coatings on the discs. This is the default speed. Pushing on the blue start button 56 once for ½ second activates Speed 1. If the results are not adequate, as measured by complete removal of the printed surface layer so that you can see the clear polycarbonate, then the next speed should be tried.

"Speed 2" is the middle speed. This speed should be used if the results at Speed 1 are not adequate. To activate Speed 2, blue button 56 should be held down for about two seconds, or until one beep is heard. If the results are not adequate, as measured by complete removal of the printed surface layer so that you can see the clear polycarbonate, then the next speed should be tried.

"Speed 3" is the slowest speed. This speed should be used if the material coatings on the discs are significant, such as in highly art intensive commercially produced discs. An example of such discs is the discs received from AOL®. To activate Speed 3, blue button 56 should be held down for about four seconds, or until two beeps are heard.

In another embodiment of the invention there can be a two-speed system in which a switch is moved into a first position to control the first speed process of approximately under 15 seconds. Movement of the switch to a second position slows the cutting speed process from about 15 seconds to about 30 seconds. This improvement permits the user of the device to push down the start button for a fraction of a second, and the controls then process the speed of the destruction cycle.

The Department of Defense uses a sticky label to identify a CD-ROM disc which contains classified information. The label is similar to an Avery® label used in bulk mailings that have pre-printed addresses. These labels have two materials other than the ink: the paper the ink is printed on, and a glue underneath the paper which holds the label to the disc. When sticky labels are removed from the CD-ROM discs, it may be necessary to slow the device to Speed 2 or Speed 3 for the cutter, which spins at 6,500 RPM, to cut through the label and then into the information bearing sub-layers of the discs.

The cutter described above is preferred but not exhaustive of the cutting arrangements that could be employed to remove an information-bearing layer. Other known cutting, grinding, or abrasive configurations could be used. See, for example, U.S. Pat. No. 6,039,637, incorporated hereon by reference.

As can be seen from the above, the present invention provides a security device particularly adapted to destroying the information-bearing surface layer of an optical disc in a rapid and efficient manner. Utilizing the present invention, the information-bearing surface layer of an optical disc can be reduced to particulate matter having a particle size as small as only about 2 microns, which is two orders of magnitude less than the minimum 250 microns required by the Department of Defense. In one embodiment of the invention, the particulate matter may have a particle size of less than about 326 microns. In another embodiment of the invention, the particulate matter may have a particle size of less than about 250 microns. In another embodiment of the invention, the particulate matter may have a particle size of from about 2 to about 200 microns. In another embodiment of the invention, the particulate matter may have a particle size of from about 10 to about 150 microns. In another embodiment of the invention, the particulate matter may have a particle size of from about 326 microns to about 5 mm.

The embodiment of the present invention represented by FIGS. 1-6 weighs only approximately 10 pounds and has a height of about 5 inches, a width of about 10 inches and depth of about 12 inches. Consequently, the device of present invention is lightweight and easily portable.

Thus, sensitive and confidential information can be accumulated in substantial amounts on compact discs, yet they are readily declassifable in short order simply by utilizing the present invention. Moreover, the substrate layers of the optical discs are retained intact for either recycling use or to identify the complete destruction of the compact disc for security purposes.

The foregoing description and the illustrative embodiments of the present invention have been described in detail in varying modifications and alternate embodiments. It should be understood, however, that the foregoing description of the present invention is exemplary only, and that the scope of the present invention is to be limited to the claims as interpreted in view of the prior art. Moreover, the invention illustratively disclosed herein suitably may be practiced in the absence of any element which is not specifically disclosed herein.

We claim:

1. A device for removing an information-bearing layer of an optical disc, which comprises:
   a housing defining a first chamber and a second chamber;
   a mount, including a planar surface, to selectively mount an optical disc having an information-bearing layer adjacent the first chamber;
   a cutter within the first chamber, the cutter comprising at least one cylindrical section with an axis of rotation, a wall disposed about the axis and having a first end and an outwardly oriented second end, and a cutting surface at the second end of the wall for cutting contact with the optical disc, the axis being disposed at an angle of from about 70° to 80° relative to the planar surface;
   a drive mechanism operatively connected to the cutter for rotating the cutter about its axis; and
   a passageway between the first and second chambers,
   wherein the cutter causes the information-bearing layer of the disc to form particulate matter and the particulate matter is caused to move through the passageway into the second chamber.

2. The device of claim 1, wherein the second chamber contains or comprises a removable member that receives particulate matter.

3. The device of claim 1, wherein the cutting surface comprises a serrated cutting edge formed about the circumference of said second end of the wall and a hollow outwardly oriented central region.

4. The device of claim 1, wherein the cutter drive mechanism is capable of causing particulate matter to flow into the second chamber.

5. The device of claim 4, wherein the cutter drive mechanism comprises a cylindrical vane assembly including a plurality of radially oriented, curved vanes that move air to cause the particulate matter to flow into the second chamber.

6. The device of claim 1, wherein a removable lid covers the second chamber.

7. The device of claim 1, wherein a lid or cover covers the first chamber.

8. The device of claim 7, wherein an additional cover member covers a disc cutter area.

9. The device of claim 7, wherein the lid or cover has a surface with a disc retaining spindle to hold the optical disc.

10. The device of claim 9, wherein the disc retaining spindle moves along a track comprising a groove having a predetermined configuration extending from a disc loading position to a disc drive position to cause the optical disc to engage a disc drive that causes the optical disc to rotate.

11. The device of claim 10, wherein the cutter engages an information-bearing layer of the optical disc.

12. The device of claim 1 which comprises an adjustable pressure component.

13. The device of claim 12, wherein the pressure component conforms to the differences in thickness of the information-bearing layers on optical discs.

14. The device of claim 1, wherein the cutter comprises a cutter support and a cutter head, the cutter support having a longitudinal central axis and a connection end, the cutter head having a tubular configuration with a connection end connected to the connection end of the cutter support and an outwardly extending, distal, cutting end including the cutting surface.

15. The device of claim 1, wherein the cutter is driven by a DC motor.

16. The device of claim 1, wherein the cutter and a vacuum system are driven by the same motor.

17. The device of claim 1, wherein the optical disc is rotated by a separate drive means.

18. A device for removing an information-bearing layer of an optical disc comprising a first chamber having a mount, including a planar surface, to selectively mount an optical disc having an information-bearing layer and a tubular cutter having an axis, a tubular wall and a cutting surface in an axial direction, wherein said axis and cutting surface is disposed at an angle of from about 70° to 80° relative to the planar surface, a second chamber having a vacuum device within or in fluid communication with said second chamber, and a passageway between the first and second chambers,
   wherein a dual purpose drive or drive mechanism is operatively connected to the cutter and to the vacuum device.

19. The device of claim 18, wherein the cutter causes the information-bearing layer of the disc to form particulate matter and the particulate matter is caused to move through the passageway into the second chamber.

20. The device of claim 18, wherein the optical disc is rotated by a separate drive means.

21. A device for removing an information-bearing layer of an optical disc while maintaining the integrity and identification of the substrate layer, said device comprising:
   a housing defining a first chamber and a second chamber adjacent said first chamber;
   a mount, including a planar surface, for selectively mounting a compact disc adjacent said first chamber;
   physical removal means disposed within said first chamber for physically removing the information-bearing layer of an optical disc positioned on said mount by reducing it to particulate material, wherein said physical removal means comprises a cutter head having at least one cylindrical section with an axis about which it rotates, a cylindrical wall disposed about the axis and and having first and second ends, and a cutting surface at the second end extending in an axial direction and disposed at an angle of from about 70° to 80° relative to the planar surface; and
   means for biasing said physical removal means against the information-bearing layer of an optical disc positioned on said mount as said information-bearing layer is reduced to particulate material.

22. A device for the destruction of an information-bearing layer of an optical disc to prevent the recovery of exploitable information therefrom, comprising a housing member having a mounting structure for selectively mounting an optical disc therewithin, the mounting structure including a planar surface, a mounting mechanism disposed within said housing for removing the information-bearing layer from the substrate layer of an optical disc positioned within said housing by physically reducing said information-bearing surface to particulate matter, said removal mechanism comprising a cutter head having at least one cylindrical section with an axis about which it rotates, a cylindrical wall disposed about the axis and having first and second ends, and a cutting surface at the second end and extending in an axial direction, and means for biasing at an angle of from about 70° to 80° measured from the axis of the cutter head to the planar surface, said removal mechanism against the information-bearing surface of an optical disc positioned on said mounting structure as said information-bearing layer is reduced to particulate matter.

23. The device of claim 22, wherein said device is capable of destroying the information-bearing layer of an optical disc while retaining the non-information-bearing substrate layers thereof substantially intact.

24. The device of claim 22, wherein said housing includes a first chamber and a second chamber adjacent said first chamber, wherein said removal mechanism is disposed within said first chamber, and wherein said removal mechanism is capable of reducing the particle size of said particulate matter to less than about 326 microns.

* * * * *